United States Patent [19]

Patel et al.

[11] Patent Number: 5,256,189
[45] Date of Patent: Oct. 26, 1993

[54] AQUEOUS OXIDATION OF SULFIDIC SILVER ORE

[75] Inventors: Chandulal P. Patel, West Vancouver; Alfred S. Hayden, Richmond Hill, both of Canada

[73] Assignee: Prime Resources Group Inc., Vancouver, Canada

[21] Appl. No.: 885,761

[22] Filed: May 20, 1992

[51] Int. Cl.$^5$ .............................................. C22B 3/44
[52] U.S. Cl. ........................................................ 75/744
[58] Field of Search ........................................... 75/744

[56] References Cited

U.S. PATENT DOCUMENTS

| | | | |
|---|---|---|---|
| T104,001 | 3/1984 | Kunter et al. | 75/118 R |
| 2,777,764 | 1/1957 | Hedley et al. | 75/105 |
| 2,810,638 | 10/1957 | Hazen | 75/744 |
| 4,188,208 | 2/1980 | Guay | 75/105 |
| 4,571,263 | 2/1986 | Weir et al. | 75/101 R |
| 4,578,163 | 3/1986 | Kunter et al. | 204/110 |
| 4,610,724 | 9/1986 | Weir et al. | 75/118 R |

Primary Examiner—Peter D. Rosenberg
Attorney, Agent, or Firm—Ridout & Maybee

[57] ABSTRACT

Refractory sulfidic silver ore which is not amenable to cyanide leaching is formed into an aqueous slurry and oxidized at elevated temperature, usually about 150° to 250° C., in the presence of an oxidizing agent, usually oxygen, and in the presence of about 30 to about 160 g/L zinc. Zinc present in the above range results in increased extractability of silver from the oxidized residue by cyanide leaching.

18 Claims, 1 Drawing Sheet

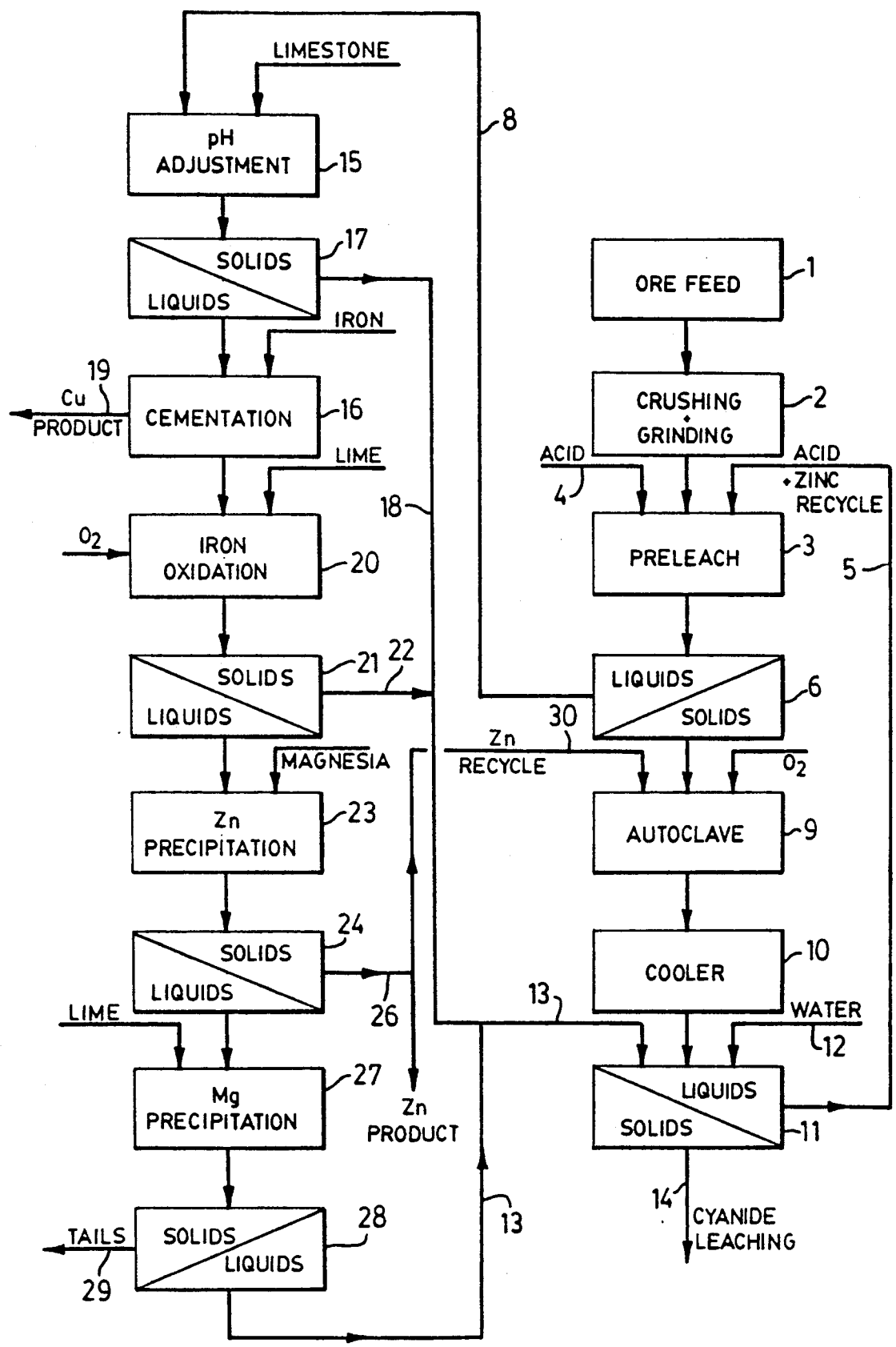

AQUEOUS OXIDATION OF SULFIDIC SILVER ORE

The widely practised cyanidation process for extracting gold and silver from their ores requires contacting the rock solids, usually after grinding the rock to a fine size, with an aqueous solution of cyanide. In the presence of sufficient oxygen, generally supplied by air, gold and silver dissolve into the solution as their respective cyanide complexes. Usually, the gold and silver solubles are recovered from solution by adsorption onto carbon particles. However some ores are such that, in order to obtain adequate extraction by cyanidation, prior oxidation may be necessary. For example, gold and silver may be dispersed within sulfide minerals and physically inaccessible to the cyanide solution. In such cases effectiveness of cyanidation may be improved by oxidation of the material, which removes the sulfide sulphur.

The oxidation may be carried out by roasting, but environmental constraints will usually require expensive treatment arrangements and precious metal recoveries may be lower than desired. Improved recoveries can usually be achieved with aqueous oxidation, wherein a water slurry of the solids is reacted with an oxidizing agent, at elevated temperature, to achieve an oxidized solids residue, and wherein the sulfide sulfur is converted to a higher oxidation state and usually principally to sulfate. The oxidized solids residue exhibits increased extractibility of precious metals by cyanide leaching. The metallic components, depending on their nature, may pass into solution. The solution resulting from the procedure normally becomes acidic owing to, for example, iron sulfides in the feed material. The starting material may also include chalcogenides other than sulfides, such as selenides or tellurides, as well as arsenides and antimony compounds containing occluded or locked in precious metals, which may be made accessible and cyanide leachable in the aqueous oxidation process. However, with conventional aqueous oxidation methods of which applicant is aware, the recoveries of silver are not as great as is desirable.

It has now been found that increased extractability of silver by cyanide from sulfidic silver material such as sulfidic silver ores or concentrates can be obtained when the aqueous oxidation step is conducted in the presence of a controlled concentration of zinc dissolved in the aqueous phase of the slurry in a range of from about 30 to about 160 g/L (all zinc concentrations herein are calculated as elemental zinc). Accordingly, the present invention provides a method of aqueous oxidation of sulfidic silver material such as sulfidic ores or concentrates containing silver to render said silver extractable by cyanide leaching, comprising forming an aqueous slurry of particles of said material, maintaining said slurry in the presence of an oxidizing agent at elevated temperature for a period sufficient to oxidize said sulfidic material to oxidized sulfur species, and adding to said slurry an amount of zinc such that said oxidation is conducted in the presence of a concentration of about 30 to about 160 g/L zinc dissolved in said slurry, based on the volume of the liquid phase of the slurry, to thereby obtain an oxidized slurry, and recovering from said oxidized slurry an oxidized solids residue of improved silver extraction by cyanidation.

It has been found that when the aqueous zinc concentration during the oxidation process is significantly below about 30 g/L or significantly above about 160 g/L, the extraction of silver by cyanide from the oxidation residue is considerably reduced. Preferably, the zinc concentration is maintained in the range about 40 to about 120 g/L zinc and still more preferably about 50 to about 80 g/L zinc.

Although the reasons why maintaining the zinc concentration in the above-mentioned ranges results in improved silver extraction are not at present completely understood, and without wishing to be bound by any theory, it is believed that the above ranges of zinc concentration tend to inhibit the formation of silver jarosite $Ag Fe_3 (SO_4)_2 (OH)_6$ which is refractory with respect to cyanide and results in losses of silver.

Generally, the aqueous oxidation process of the invention may be carried out in the conventional manner. Aqueous oxidation processes are well known to those skilled in the art and are detailed in various prior patents and publications:

U.S. Pat. Nos. 2,777,764 (Hedley et al), 4,610,724 (Weir et al) and 4,578,163 (Kunter et al); and U.S. Defensive Publication T 104,001 (Kunter et al) and the related published file of the unexamined Kunter et al application Ser. No. 349,149 dated Feb. 16, 1982; all of which are incorporated herein by reference for their disclosures of aqueous oxidation processes.

The starting sulfidic mineral material to be treated may be in the form of an ore or a concentrate obtained by processing of an ore to reduce or eliminate the content of gangue materials. Usually, a starting material ore will need to be crushed and ground to a particle size which increases the surface area available for reaction and such that it can readily be formed into a pulp or slurry. The particle size is not especially critical but preferably is as in the conventional processes, for example about 80% less than 200 mesh (Tyler Standard Sieve). The oxidation of the sulfide sulfur is strongly exothermic and it is therefore usually desirable to limit the weight percent solids or pulp density and the concentration of sulfide sulfur to avoid excessive increases in temperature during the oxidation process. The concentration of sulfide sulfur should, however, be sufficiently high that sufficient heat is generated to compensate for heat losses and assist in maintaining a desired operating temperature or temperature range. Preferably, the concentration of sulfide sulfur in the starting material slurry is about 0.5 to about 2.5% by weight based on the total weight of the slurry, more preferably about 1 to about 2% by weight.

Preferably, the particles of ore or concentrate are reacted with a sulfuric acid solution before oxidation. In the event that the starting material composition contains carbonate or other gangue material liable to decomposition with evolution of carbon dioxide during the oxidation process, the pre-treatment with sulfuric acid in a preleaching step serves to decompose the acid decomposable compounds. As mentioned below, usually the oxidation process is performed under elevated pressure of oxygen gas and removal of the gas-producing compounds from the starting material compositions avoids the need to bleed excess quantities of gas from the pressurized reactor, with concomitant loss of oxygen. Preferably, the preleaching step is conducted by slurrying the said particles with a liquid phase recovered from the oxidized slurry after the oxidation process. Such liquid phase normally contains an elevated concentration of sulfuric acid.

Following the preleaching step it may be necessary to concentrate the slurry by removing liquid phase from the slurry to achieve a desired concentration of sulfide sulfur in the starting material slurry.

Usually, a predetermined quantity of a base or of sulfuric acid is added to the starting material ore or concentrate before oxidation, so that the oxidation is conducted in the presence of a quantity of acid maintained at a controlled level. During the oxidation process the acidity increases as a result of formation of acid by oxidation of sulfide sulfur. Preferably the oxidation is conducted in the presence of a content of free acid in the range about 2 to about 20 g/L, based on the volume of the liquid phase of the oxidized slurry, more preferably about 5 to about 20 g/L, since it has been found that increased extractions of silver are achieved when the acidity is maintained in the above-mentioned ranges. In the case in which a base has to be added, the base may be any material which will not interfere with the pressure oxidation or with the subsequent cyanidation reaction. For example the base may be lime, zinc oxide or magnesia.

In the preferred form, continuous oxidation processing is employed, wherein starting material slurry is continuously fed to a reactor, usually a multi-compartmented autoclave, wherein the extent of oxidation, and the acidity, increase as the slurry moves through the reactor, and oxidized slurry is continuously withdrawn therefrom. The above references to acidity, and all other references herein to the oxidation conditions, refer to the oxidized slurry at the point where it leaves the reactor.

In the case in which the starting material ore comprises a substantial content of zinc, usually in the form of zinc sulfide or complex forms thereof, the content of zinc solubilized in the aqueous phase of the slurry increases as the oxidation progresses. In the case in which the starting material ore contains substantially no zinc, the final content of zinc in the aqueous phase consists solely of the zinc added with the starting material slurry. In the method of the invention, a quantity of zinc is added with the starting material in an amount sufficient to achieve a total concentration of about 30 to about 160 g/L zinc, preferably about 40 to about 120 g/L zinc, more preferably about 50 to about 80 g/L zinc, dissolved in the oxidized slurry at the completion of the oxidation reaction, such zinc concentration consisting of the added zinc together with any solubilized zinc formed from the starting material solids in the course of the oxidation reaction. The zinc may be added in any form in which it will dissolve in the acidic slurry during oxidation, for example in the form of zinc sulfide, zinc sulfate, zinc oxide, zinc hydroxide, etc. It may be preferred to add zinc in the form of zinc sulfide, for reasons of ready availability and cost. In the preferred form, as described in more detail below, as much as possible of the zinc dissolved in the oxidized slurry at the completion of the oxidation reaction is recycled to the starting material from the liquid phase of the oxidized slurry. If required, additional zinc may be recycled from a zinc product circuit to which is supplied soluble components of the oxidized slurry including solubilized zinc.

In order to increase the rate of reaction so that the oxidation proceeds to the desired stage within a reasonably short period of a few hours or less, and to avoid complications due to the formation of elemental sulfur, preferably the slurry is maintained during the oxidation under super atmospheric pressure and at temperature in the range of about 150° C. to about 250° C. More preferably, the temperature is in the range about 180° C. to about 220° C.

Usually, the oxidizing agent employed is oxygen, for reasons of its ready availability, effectiveness and cost. The oxygen is supplied to the autoclave or other oxidation reactor under elevated pressure, typically at an over pressure of about 50 to about 200 psi, in order to maintain a desired oxidizing atmosphere in the reactor. Other conventional oxidizing agents may however be employed. Conveniently, the oxidizing condition within the oxidation reactor is controlled by monitoring the oxidation potential (emf) of the slurry relative to a standard electrode and adjusting the over pressure of oxygen or rate of addition of oxidizing agent accordingly. Preferably, the oxidation potential of the slurry is in the range about 600 to about 750 mV expressed as emf relative to a standard hydrogen electrode (Eh). At oxidation potentials (Eh) greater than about 750 mV, the oxidized solids residue tends to exhibit decreased extractability of silver by cyanide leaching. The reason for this is not at present fully understood, but it is believed to be associated with increased formation of intractable silver jarosite. More preferably the oxidation potential (Eh) is about 600 mV to about 680 mV.

As in conventional oxidation procedures, the slurry is preferably agitated while undergoing oxidation in order to maintain the ore in intimate contact with the oxidizing agent. In the case in which the oxidizing agent is a gas, for example oxygen, the oxidizing gas is usually sparged into the slurry and in addition the slurry is agitated by mechanical impellers. Under the preferred condition, the oxidation is substantially complete in less than about 3 hours.

Following the oxidation procedure, the oxidized slurry may be subjected to solids-liquids separation, the solids washed to free them from metal salts or other solubles likely to interfere with cyanide extraction, and then the washed oxidized solids residue may be subjected to cyanide leaching using conventional techniques.

The accompanying single figure of drawings shows, by way of example only a schematic flow sheet illustrating one form of the method of the invention.

Referring to the drawings, the oxidation method is applied to a sulfidic silver ore 1 from which silver is poorly extractable by cyanide leaching. In the example illustrated, the ore contains, apart from silver, substantial quantities of iron (typically about 1% to about 10% by weight), zinc (typically about 0.5% to about 10% by weight) and copper (typically about 0.5% to about 10% by weight). It is therefore desirable to recycle zinc to the feed stream to the oxidation step in order to maintain the required content of zinc in the oxidation slurry. Also, it is desirable to recover copper as a valuable by-product.

The ore to be treated often will additionally contain gold in a form which is substantially non-leachable by cyanide leaching. Often the gold will be present distributed in a refractory sulfide or other non-leachable matrix, and is rendered cyanide leachable by the present oxidation process.

For example, one typical ore to which the process may be applied assayed as follows (all percentages are by weight based on the total weight of the ore; t=metric tonne).

TABLE 1

| | |
|---|---|
| gold | 98 g/t |
| silver | 3329 g/t |
| zinc | 9.26% |
| copper | 0.88% |
| sulfur | 9.19% |
| arsenic | 0.17% |
| antimony | 1.52% |
| iron | 4.41% |
| carbon (graphite) | 1.83% |
| carbon (organic) | 0.06% |
| magnesium | 5.68% (calculated as MgO) |
| calcium | 5.28% (calculated as CaO) |
| gangue materials | balance ($SiO_2 > 30\%$) |

As will be appreciated, although one ore has been described above, the present process may be applied to other sulfidic silver material ores as well as to like sulfidic silver materials such as concentrates, which differ principally from ores in that they contain smaller quantities of inert or gangue materials. The ore feed in the present example, after crushing and grinding 2 in the conventional manner, is subjected to preleaching 3 to destroy carbonate in the ore. Typically, the preleaching is conducted by agitating the ground ore in contact with sulfuric acid for about 1 hour. The acid in the example illustrated in part is make-up sulfuric acid 4 supplied to the system and in part is obtained from acid washings 5 recycled from the oxidized slurry. In the preferred form, the total quantity of acid added is controlled so that, when taken together with the acid generated by oxidation of sulfide sulfur in the oxidation step, the slurry contains a free acidity of about 2 to about 20 g/L $H_2SO_4$. As noted above, in the case in which, owing to the composition of the ore 1 a high concentration of acid tends to be generated it may be necessary to add a base to the material before autoclaving in order to maintain a desired acidity in the oxidized slurry.

The solids content of the preleached slurry is adjusted to achieve a desired concentration of sulfide sulfur. Such adjustment may be conducted by adding water, where dilution is required, or by partial solids/liquids separation 6 as in the example illustrated, where concentration is required to achieve a content of sulfide sulfur preferably in the range about 0.5 to about 2.5% by weight based on the total weight of the slurry. Such partial liquids separation may be conducted in, for example, a conventional thickener apparatus. The removed liquids 8 are directed to the pH adjustment.

The thickened slurry is passed to an autoclave 9. Since the recycle stream 5 contains solubilized zinc as well as acid and other solubilized materials such as iron and copper, and only a part of the liquid is removed in the device 6, the stream 5 serves to recycle zinc to the feed to the autoclave 9. At the autoclave 9, the thickened slurry is mixed with additional recycled zinc 30 added in an amount such that the oxidation is conducted in the presence of a total content of solubilized zinc in the range about 30 to about 160 g/L, preferably about 40 to about 120 g/L and most preferably about 50 to about 80 g/L measured as elemental zinc and based on the volume of the liquid phase of the oxidized slurry.

Within the autoclave 9, the slurry is brought up to conventional oxidation temperatures with super atmospheric pressures under agitation and with sparging of pressurized oxygen into the slurry. The supply of oxygen is preferably controlled to achieve an oxidation potential (Eh) of about 600 to about 750 mV, more preferably about 600 to about 680 mV. The slurry is exposed to oxidation conditions for a period sufficient to achieve substantially complete oxidation of sulfide sulfur to sulfate and other oxidized species. Typically, the residence period within the autoclave 9 will be a few hours, for example about 1 to about 2 hours. The oxidized slurry is discharged through a cooler 10 to a solids/liquids separation device 11, for example a thickener, within which the slurry is washed with water and barren liquor supplied along lines 12 and 13 respectively, in order to substantially free it of the acid and other solubles, including solubilized zinc, copper, iron and other components derived from the starting material ore. The separated liquid phase, having a high content of free acidity, is passed along the acid and zinc recycle line 5 and the washed separated solids 14 are passed to cyanide leaching which may be conducted employing conventional procedures.

The acid washings taken from the separator 6 along line 8 are adjusted in pH at station 15 from typically about pH 0.5 to about pH 3 to avoid excessive consumption of iron during the subsequent cementation step 16. The pH cannot at this stage be increased above about pH 3 since there is a risk of precipitation of basic copper compound, for example copper hydroxide or the like, in the circuit as illustrated. Any base which does not interfere with the subsequent separation of copper and zinc may be employed for the pH adjustment. In the system illustrated, because of its low cost and ready availability, limestone ($CaCO_3$) is added to achieve pH about 3.0 to about 3.5. The limestone addition produces turbidity as a result of formation of $CaSO_4$, and the mixture is passed to a solids/liquids separator 17, preferably in the form of a clarifier/surge tank, from which the underflow solids are taken along a line 18 and are mixed with the cooled oxidized slurry from the cooler 10. The overflow solution is passed to cementation reactor 16 to which iron particles are added and elemental copper is precipitated out in the well-known cementation reaction. The copper product obtained is recovered along line 19. The mother liquor from the cementation reactor is passed to a vessel 20 wherein ferrous iron is oxidized and precipitated as ferric iron, by increasing the basicity to about pH 4.5 by addition of lime (CaO) and by sparging air into the reaction mixture. The solids, comprising precipitated ferric iron and calcium sulfate solids, are separated out in a solids/liquids separator 21, which may be, for example a clarifier/surge tank, and are directed to the oxidized slurry along line 22. The liquid phase, after filtration if necessary to remove turbidity, is passed to a vessel 23 wherein zinc solids, in the form of zinc oxide/hydroxide mixture, are precipitated out by adding a base to the liquor, preferably magnesia (MgO) which does not form a precipitate in the presence of sulfate. Other bases such as alkali metal hydroxide could of course be employed but magnesia is preferred by reason of its cost, ready availability and effectiveness. The zinc solids are separated at a solids/liquid separator 24, preferably a clarifier/surge tank and are recovered along line 26. A measured portion of the solids are recycled to the autoclave 9 along line 30 to be mixed with the sulfidic material before oxidation and achieve the required zinc concentration during the oxidation step, and the remainder is recovered as valuable zinc product. The liquid phase, comprising an acidic solution of magnesium sulfate, is treated with lime (CaO) added at 27 to precipitate magnesium hydroxide which is separated at a clarifier/surge tank or other solids/liquids separator device 28 and may be passed to tails along line 29. The barren liquor recovered at the device 28 may be recycled along line 13 to the oxidized solids washing stage 11.

Although the above provides ample information to enable one of ordinary skill in the art to conduct the present method, for the avoidance of doubt some detailed examples will be described.

EXAMPLE 1

Pressure oxidation was conducted in the following manner. Dry ore of the composition given about in Table 1 was ground for 45 minutes per kg in admixture with water, at 50% solids, in a laboratory ball mill. The resulting slurry was pulped with water at 20% solids. A sample of the slurry (solution volume 920 ml, solids weight 230 g) was conditioned with 6 ml conc. $H_2SO_4$ (48 kg conc. $H_2SO_4$ per tonne of solids feed) and with 45 g/L zinc (calculated as elemental zinc) added in the form of zinc sulfate, for 1 hour. This step decomposed carbonate present in the ore. The conditioned pulp was sealed in an autoclave, agitated with a mechanical agitator at 760 rpm, and was heated to 200° C. while maintaining an oxygen overpressure of 100 psi. An off gas stream was directed through an oxygen analyzer in order to monitor the overpressure of oxygen. After 1 hour samples (120 ml) were removed from the autoclave every 10 minutes for 4 hours. Each sample was weighed and filtered. The filtrate volume and dry filter cake weight were determined to allow for material balance and residence time calculation. The filtrate emf (Eh) and free acidity (g/L $H_2SO_4$) were monitored for control purposes. Each time a sample was removed from the autoclave it was replaced with 120 ml of slurry conditioned as described above, which was injected into the autoclave.

The oxidized solids residue was treated as follows. Each filter cake obtained as described above was washed with 25 g/L $H_2SO_4$ (two washings each employing 200 ml of the acid per 129 g of filter cake) and with water (three washings each of 200 ml water per 129 g of filter cake).

Cyanide leaching on the washed oxidized solids was conducted as follows. Each washed cake was repulped with water (20% solids), transferred into a laboratory bottle, and neutralized with lime (CaO) until the pH reached 11.0 to 11.5. Preattritioned carbon particles (75 g/L) were added and NaCN (5.0 g/L) was added. A carbon-in-leach (CIL) test was conducted by rolling the mixture in the bottle on rolls for 24 hours. The carbon was screened out at the end of the test and the barren pulp was filtered and water washed. The carbon and barren pulp were analyzed for silver content and the percentage extraction of silver (percentage extracted onto the carbon based on the weight of silver present in the filter cake) was determined.

EXAMPLES 2 to 13

Example 1 was repeated with variations in three operating parameters. Firstly, the concentration of zinc dissolved in the slurry during the oxidation was varied by varying the amount of zinc sulfate solution added in the conditioning step described above. Secondly, the oxidation potential (Eh) of the slurry during the oxidation step was varied by varying the oxygen overpressure maintained during the oxidation in the autoclave. Thirdly, the content of free acid ($H_2SO_4$) present during the oxidation was varied by varying the quantity of $H_2SO_4$ added during the conditioning step.

EFFECT OF ZINC ON SILVER EXTRACTION

It was determined that increased silver extraction was obtained when the oxidation was conducted in the presence of about 30 to about 160 g/L zinc, preferably about 40 to about 120 g/L and more preferably about 50 to about 80 g/L. Results of various Examples conducted as described above are summarized in Table 2 below.

TABLE 2

| Example No | Zinc g/L | Free Acid g/L | Iron g/L | Eh mV | Ag Extraction % |
|---|---|---|---|---|---|
| 2 | 15.1 | 18 | 0.22 | 708 | 61.0 |
| 3 | 59 | 14 | 0.56 | 645 | 95.5 |
| 4 | 74.8 | 16 | 0.70 | 643 | 95.9 |
| 5 | 86 | 14.4 | 0.72 | 668 | 96.1 |
| 6 | 126.5 | 13 | 1.78 | 626 | 91.8 |
| 7 | 148.8 | 13 | 1.69 | 647 | 90.2 |

EFFECT OF OXIDATION POTENTIAL (Eh) ON SILVER EXTRACTION

It was determined that increased silver extraction was obtained when the oxidation was conducted at Eh preferably about 600 to about 750 mV, more preferably about 600 to about 680 mV.

Results of various Examples conducted as above are summarized in Table 3 below.

TABLE 3

| Example No | Zinc g/L | Free Acid g/L | Iron g/L | Eh mV | Ag Extraction % |
|---|---|---|---|---|---|
| 8 | 14.5 | 18.4 | 0.19 | 753 | 13.7 |
| 2 | 15.1 | 18.0 | 0.22 | 708 | 61.0 |
| 9 | 14.9 | 21.2 | 0.32 | 742 | 26.7 |
| 10 | 13.9 | 21.6 | 0.26 | 711 | 43.7 |

It will be noted the data of Example 2 are presented in Table 3 for ease of comparison.

EFFECT OF SULFURIC ACID (FREE ACIDITY)

It was determined that increased silver extraction was obtained when the oxidation was conducted in the presence of free acidity ($H_2SO_4$) of preferably about 2 to about 20 g/L based on the volume of the slurry, more preferably about 5 g/L to about 20 g/L.

Results of various Examples conducted as above are summarized in Table 4 below.

TABLE 4

| Example No | Zinc g/L | Free Acid g/L | Iron g/L | Eh mV | Ag Extraction % |
|---|---|---|---|---|---|
| 2 | 15.1 | 18.0 | 0.22 | 708 | 61.0 |
| 11 | 14.3 | 22.4 | 0.22 | 714 | 44.4 |
| 3 | 59 | 14 | 0.56 | 645 | 95.5 |
| 12 | 54 | 24 | 0.90 | 681 | 77.8 |
| 3 | 59 | 14 | 0.56 | 645 | 95.5 |
| 13 | 71 | 7.8 | 0.20 | 633 | 95.6 |

It will be noted the data of Examples 2 and 3 are produced in Table 4 for ease of comparison.

I claim:

1. A method of aqueous oxidation of sulfidic silver material to render said silver extractable by cyanide leaching, comprising forming an aqueous slurry of particles of said material, maintaining said slurry in the presence of an oxidizing agent under super atmospheric pressure at temperature in the range of about 150° C. to 250° C. for a period sufficient to oxidize said sulfidic material to oxidized sulfur species, and adding to said material before oxidation an amount of zinc-bearing material such that said oxidation is conducted in the presence of a concentration of about 30 to about 160 g/L zinc dissolved in said slurry, based on the volume of the aqueous phase of the slurry, to thereby obtain an oxidized slurry, and recovering from said oxidized slurry an oxidized solids residue of greater silver extractability by cyanide than said sulfidic silver material.

2. A method according to claim 1 wherein said zinc concentration is about 40 to about 120 g/L.

3. A method according to claim 1 wherein said zinc concentration is about 50 to about 80 g/L.

4. A method according to claim 1 wherein said material contains iron impurity and said oxidation is conducted in the presence of a content of free $H_2SO_4$ of about 2 to about 20 g/L based on the volume of the aqueous phase of the slurry.

5. A method according to claim 4 wherein said content of $H_2SO_4$ is about 5 to about 20 g/L.

6. A method according to claim 1 wherein said slurry has an oxidation potential (Eh) of about 600 to about 750 mV.

7. A method as claimed in claim 6 wherein said potential is about 600 to about 680 mV.

8. A method according to claim 1 wherein said temperature is about 180° to about 220° C.

9. A method according to claim 1 wherein said oxidizing agent is oxygen.

10. A method according to claim 1 wherein said slurry comprises about 0.5 to about 2.5% by weight sulfide sulfur based on the total weight of the slurry.

11. A method according to claim 1 wherein said slurry comprises about 1 to about 2% by weight sulfide sulfur based on the total weight of the slurry.

12. A method according to claim 1 wherein the sulfidic silver material contains substantially no zinc.

13. A method according to claim 12 wherein zinc is added in the form of zinc sulfide.

14. A method according to claim 1 wherein the sulfidic silver material comprises a substantial content of zinc and including the steps of treating a liquid phase containing solubilized zinc derived from a liquid phase of said oxidized slurry to precipitate a zinc containing solid, and mixing a measured portion of said zinc containing solid with said sulfidic material before oxidation.

15. A method according to claim 1 including the steps of recovering a liquid phase containing sulfuric acid and solubilized zinc separately from the oxidized solids of said oxidized slurry, and subjecting the sulfidic silver material to a preleaching step before oxidation by mixing said liquid phase with particles of said material to form a preleached slurry.

16. A method according to claim 15 wherein said material contains carbonate and said preleaching step decomposes said carbonate.

17. A method according to claim 15 wherein the solids content of said preleached slurry is adjusted before oxidation.

18. A method according to claim 17 wherein the solids content is increased by removal of liquid phase from the preleached slurry.

* * * * *